United States Patent
Chung et al.

(10) Patent No.: US 9,007,526 B2
(45) Date of Patent: *Apr. 14, 2015

(54) UPGRADEABLE DISPLAY DEVICE AND METHOD FOR CONTROLLING THE SAME

(75) Inventors: Wooseong Chung, Pyeongtaek-si (KR);
Dohyung Kim, Pyeongtaek-si (KR);
Kyutae Ahn, Pyeongtaek-si (KR);
Hwemo Kim, Pyeongtaek-si (KR);
Chongsok Kim, Pyeongtaek-si (KR);
Jaehan Park, Pyeongtaek-si (KR);
Seoksoo Lee, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/605,191

(22) Filed: Sep. 6, 2012

(65) Prior Publication Data

US 2013/0258195 A1 Oct. 3, 2013

(30) Foreign Application Priority Data

Apr. 2, 2012 (KR) ........................ 10-2012-0034062

(51) Int. Cl.
*H04N 5/44* (2011.01)
*H04N 7/00* (2011.01)
(Continued)

(52) U.S. Cl.
CPC .......... *H04N 21/4183* (2013.01); *H04N 21/443* (2013.01); *H04N 21/4586* (2013.01); *H04N 21/818* (2013.01)

(58) Field of Classification Search
CPC ... H04N 5/4401; H04N 5/44513; H04N 5/44; H04N 7/00; H04N 11/00; H04N 21/435; H04N 21/235; H04N 21/4345; H04N 7/17318

USPC .......... 348/552–570, 725–734; 725/100–151, 725/39–50
See application file for complete search history.

(56) References Cited

U.S. PATENT DOCUMENTS

| 6,331,876 | B1 * | 12/2001 | Koster et al. ................. 348/725 |
| 2003/0036870 | A1 | 2/2003 | Kim ............................. 702/119 |
| 2006/0285690 | A1 * | 12/2006 | Jung ............................ 380/237 |
| 2008/0016241 | A1 * | 1/2008 | Cho ............................. 709/238 |
| 2008/0216100 | A1 * | 9/2008 | Li et al. ....................... 719/330 |

(Continued)

FOREIGN PATENT DOCUMENTS

| EP | 1 156 671 | 11/2001 |
| JP | 11-053289 | 2/1999 |
| WO | WO 2009/014851 | 1/2009 |

OTHER PUBLICATIONS

European Search Report issued in related Application No. 12006312.8, dated Aug. 16, 2013.

*Primary Examiner* — Michael Lee
(74) *Attorney, Agent, or Firm* — Ked & Associates, LLP

(57) ABSTRACT

A display device and a method of upgrading the same are disclosed. The display device, such as a Smart TV, may include a broadcast receiver for receiving a broadcast signal, a demultiplexer for demultiplexing the received broadcast signal, a decoder for decoding the demultiplexed broadcast signal, and a display for displaying the decoded broadcast signal. The display device may also include an external device interface for receiving upgrade data from an upgrade device. A controller may be configured to process the received broadcast signal for display on the display and to upgrade the display device using the received upgrade data. The upgrade data may include at least one function. A control module may be configured to assign the at least one function to at least one of the upgrade device or the controller to execute the function on the display device.

9 Claims, 16 Drawing Sheets

(51) Int. Cl.
*H04N 11/00* (2006.01)
*H04N 21/418* (2011.01)
*H04N 21/443* (2011.01)
*H04N 21/458* (2011.01)
*H04N 21/81* (2011.01)

(56) References Cited

U.S. PATENT DOCUMENTS

2010/0013997 A1\* 1/2010 Hwang .................. 348/553
2010/0299712 A1\* 11/2010 Austin et al. ................ 725/81

\* cited by examiner

FIG. 11A
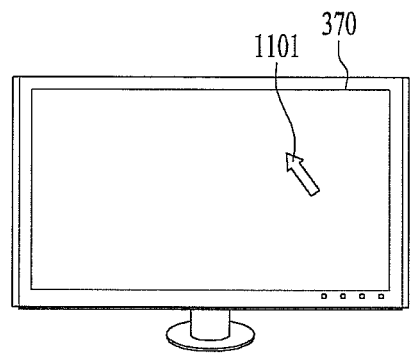
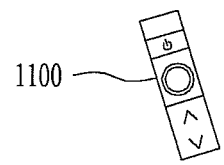
FIG. 11B
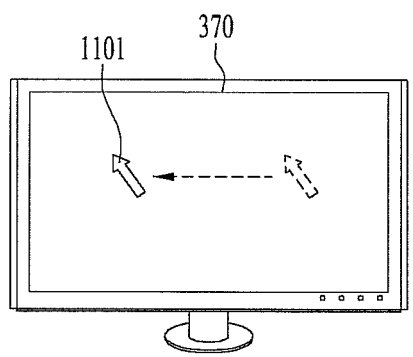
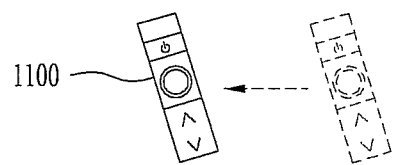

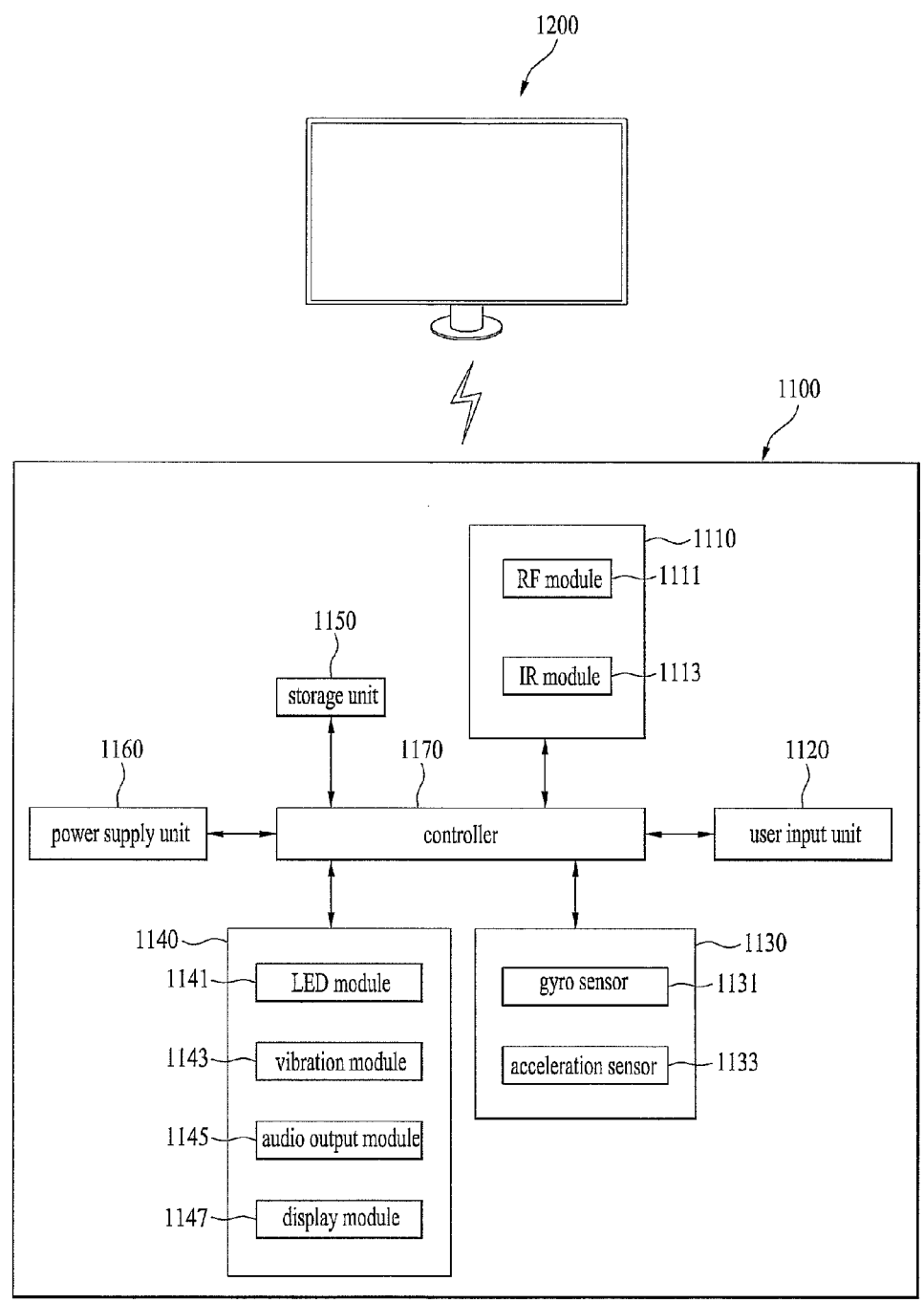

UPGRADEABLE DISPLAY DEVICE AND METHOD FOR CONTROLLING THE SAME

CROSS-REFERENCE TO RELATED APPLICATION(S)

This application claims priority under 35 U.S.C. §119 to Korean Application No. 10-2012-0034062 filed in Korea on Apr. 2, 2012, whose entire disclosure(s) is/are hereby incorporated by reference.

BACKGROUND

1. Field

An upgradeable display device and method for controlling the same are disclosed herein.

2. Background

Upgradeable display devices and methods for controlling the same are known. However, they suffer from various disadvantages.

BRIEF DESCRIPTION OF THE DRAWINGS

The embodiments will be described in detail with reference to the following drawings in which like reference numerals refer to like elements wherein:

FIG. 12 is a block diagram of the remote controller of FIG. 11;

DETAILED DESCRIPTION

Figure 1:
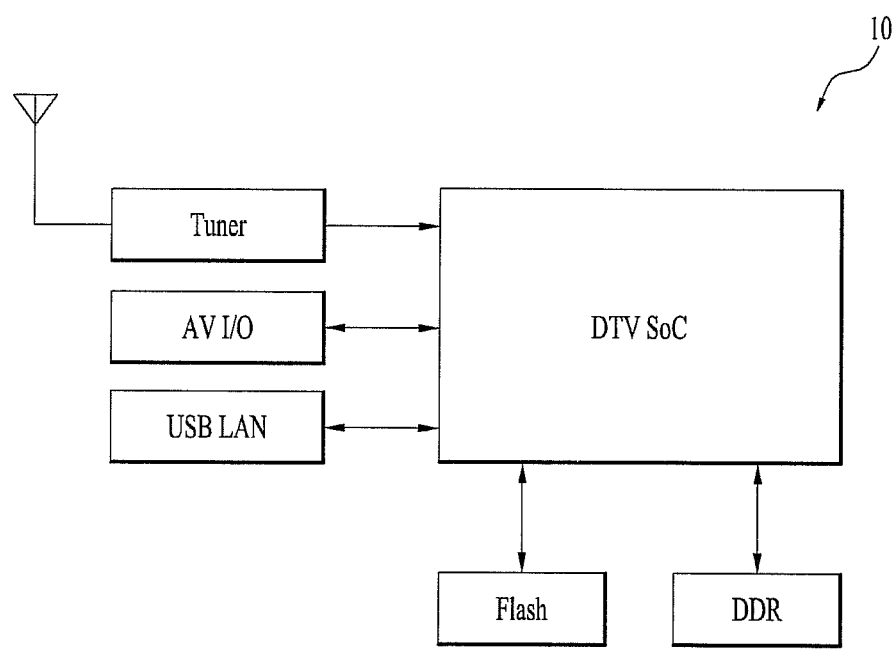
FIG. 1 is a block diagram of a display device to one embodiment of the present disclosure.

Although embodiments of the present disclosure will be described in detail with reference to the accompanying drawings and content of the drawings, the present disclosure is not limited or restricted by such embodiments.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

The terms "module," "unit" or "part" used to signify components are used herein merely to aid in understanding of the components, and thus they should not be considered as having specific meanings or roles. Accordingly, the terms "module," "unit" or "part" may be used interchangeably.

A display device may be a network TV, smart TV, hybrid broadcast broadband television (HBBTV), Internet TV, web TV, Internet protocol television (IPTV), etc. The display device, for example, a digital TV receiver, may process and display not only a broadcast signal received through a satellite or a cable but also video or audio data provided by various external devices such as a video cassette recorder (VCR), a digital versatile disc (DVD) player, a personal computer (PC), a set-top box (STB), etc., which are connected thereto. The external devices (e.g., STB) may be integrated into the display device. Display devices may also access a server through a network and process data or content provided by the server.

Although display related technologies are rapidly being developed, it may be difficult to upgrade the display device with these performance improvements after the purchase of the display device. A conventional display device may be upgraded through after-sale service. However, technical knowledge and additional equipment may be required to perform the upgrade. In addition, when a display device is upgraded, existing components of the display device may no longer used or may be discarded in many cases. This results in wasted hardware and may not be cost effective.

A display device and method for controlling the same as broadly disclosed and embodied herein addresses these and other limitations. The display device as disclosed may be easily upgraded after purchase. The display device may be easily upgraded using an upgrade device having an updated version of hardware and/or software. The upgrade device may be removably connected to the display device. Accordingly, the display device may be easily upgraded without technical knowledge or additional equipment by simply connecting an upgrade device to the display device. Moreover, a display device may continue to use existing hardware, which may have otherwise been obsolete, even after the upgrade. It should be appreciated that the upgrade device as disclosed herein may be used to upgrade display devices as well as other types of devices connectable to a display device, such as a STB.

A display device may be an intelligent network TV having a computer-support function in addition to a broadcast reception function and can include an interface that can be conveniently used, such as a handwriting type input unit, a touchscreen or a spatial remote controller. Furthermore, the display device can be connected to the Internet and a computer since the display device can support a wired or wireless Internet function, and thus a user can be provided with services such as e-mail, web browsing, banking and gaming services through the display device. The display device can use a standardized general-purpose operating system (OS) in order to execute functions relating to the above-mentioned various services. Accordingly, the display device can execute various user-friendly functions by freely adding and deleting various applications on a general-purpose OS kernel.

FIG. 1 is a block diagram of a display device according to one embodiment of the present disclosure. The display device 10 may perform a broadcast reception function. However, even prior to being upgraded, the display device 10 can execute a smart function including a computer-support function, which will be described below with reference to FIG. 3.

In embodiments of the present disclosure, the smart function may include all functions that can be performed by a smart TV in addition to the broadcast reception function. For example, the smart function may include a function of using wired/wireless Internet, enable connectivity to a computer, executing various applications installed in the display device, or another appropriate function that provides enhanced user accessibility on the display device.

Figure 2:
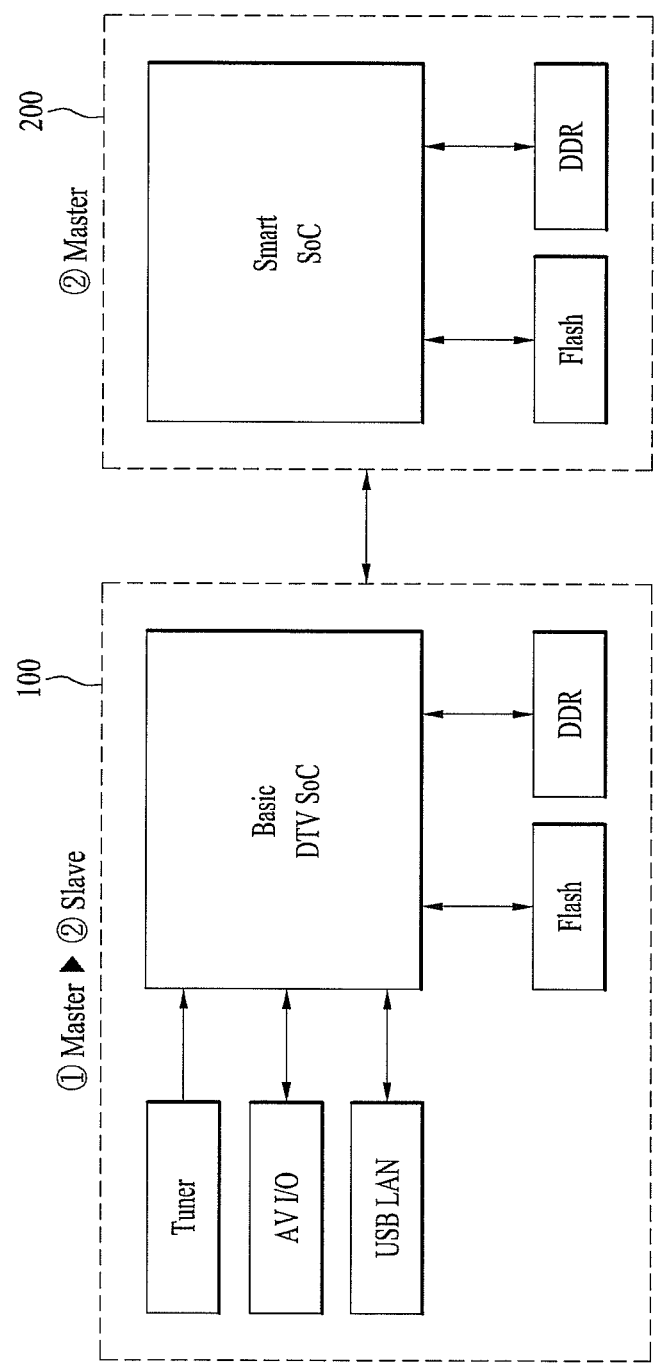
FIG. 2 is a block diagram of a display device equipped with an upgrade device according to one embodiment of the present disclosure.

FIG. 2 is a block diagram of a display device equipped with an upgrade device according to one embodiment of the present disclosure. As shown in FIG. 2, an upgrade device 200 can be connected to an existing display device 100 to upgrade the display device 100. Accordingly, the display device 100 can be updated by upgrading the upgrade device 200.

The existing display device 100 can perform a smart function in addition to a broadcast reception function, and a system-on-chip (SoC) corresponding to a controller of the display device 100 may control the overall operation of the display device 100 with display device control authority until the upgrade device 200 is connected to the display device 100. Upon connection of the upgrade device 200 to the display device 100, the upgrade device 200 or the controller of the display device 100 may have the control authority after the display device 100 is upgraded, which will be described later with reference to FIG. 4.

Since both the upgrade device 200 and the controller of the display device can be used to control the display device 100, the upgrade device 200 and the controller may operate to complement each other, thereby improving system efficiency. For example, the upgrade device 200 and the controller may cooperatively execute to process a requested function, based on an assignment of the function to the upgrade device 200 or the controller according to type, as described in further detail hereinafter.

Figure 3:
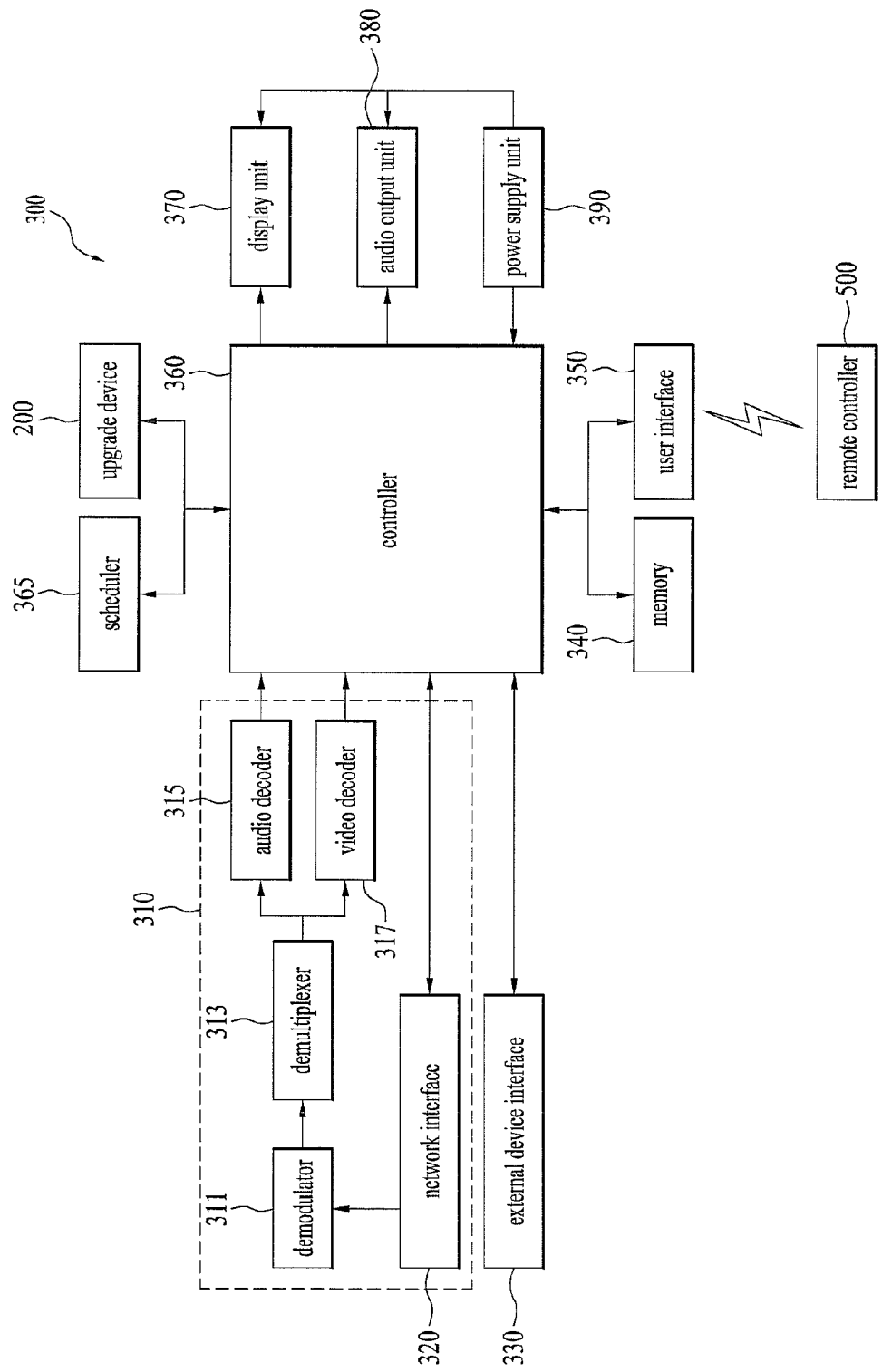
FIG. 3 is a block diagram of an upgradeable display device according to one embodiment of the present disclosure.

FIG. 3 is a block diagram of an upgradeable display device according to one embodiment of the present disclosure. It should be appreciated that the configuration of modules as shown in FIG. 3 are illustrative and one or more of the modules may be deleted or a new module may be added as necessary.

A display device 300 may include a broadcast receiver 310, a network interface 320, an external device interface 330, a memory 340, a user interface 350, a controller 360, a scheduler 365 (control module), a display unit 370, an audio output unit 380, and a power supply unit 390. In addition, the display device 300 may include the upgrade device 200 which is physically separate from the display device 300.

The broadcast receiver 310 may include a demodulator 311, a demultiplexer 313, an audio decoder 315, a video decoder 317, and the network interface 320. The broadcast receiver 310 may be designed to include the demodulator 311 and the demultiplexer 313 without the network interface 320 or it may include the network interface 320 without the demodulator 311 and the demultiplexer 313.

The network interface 320 may receive a broadcast signal including audio data and video data and may include a tuner. The tuner can select a radio frequency (RF) broadcast signal(s) corresponding to a channel selected by a user or all previously stored channels from among RF broadcast signals received through an antenna.

The network interface 320 may include an Ethernet terminal, for example, to access a wired network. In addition, the network interface 320 can use communication protocols such as wireless LAN (WLAN) (Wi-Fi), wireless broadband (WiBro), world interoperability for microwave access (WiMax), high speed downlink packet access (HSDPA), etc., for wireless network access. Furthermore, the network interface 320 can select a desired application from within open applications to receive the selected application.

The demodulator 311 may receive a digital IF signal converted by the network interface 320 or the tuner and demodulates the digital IF signal.

The demultiplexer 313 may demultiplex audio data and video data included in the demodulated signal. The demultiplexed audio data may be decoded by the audio decoder 315 and the demultiplxed video data may be decoded by the video decoder 317.

The decoded audio data and video data may be input to the controller 360. The controller 360 may perform an additional process on the audio data and video data input thereto, and then output an image corresponding to the video data through the display unit 370 and output sound corresponding to the audio data through the audio output unit 380.

The external device interface 330 may be connected to an external device and a network device. To achieve this, the external device interface 330 may include an A/V input/output unit or a wireless communication unit.

The external device interface 330 can be connected to external devices such as a digital versatile disc (DVD) player, a Blu-ray disc (BD) player, a game console, a camera, a camcorder, a computer (notebook computer), etc., in a wired/wireless manner. Furthermore, the external device interface 330 can receive an application or an application list, which may be stored in remote device, and deliver the application or application list to the controller 360 or the memory 340. Moreover, the external device interface 330 can receive upgrade data from the upgrade device 200 and transmit the upgrade data to the memory 340 or the controller 360.

The upgrade data can include an upgrade program required to improve and correct firmware that is necessary for control and management of hardware after shipment, such as OSD correction, new audio device effect, standby power reduction algorithm, software bug correction, or another appropriate type of upgrade data. In addition, the upgrade data can include information about hardware additionally supported by the upgrade device 200 and control data for controlling the hardware. Furthermore, the upgrade data can include additional information containing version information of the upgrade device 200.

The external device interface 330 may include an Ethernet terminal, for example, to access a wired network. In addition, the network interface 320 can use communication protocols such as Wi-Fi, WiBro, WiMax, HSDPA, etc. for wireless network access. Furthermore, the external device interface 330 may select a desired application from within open applications to retrieve the selected application.

The memory 340 may be configured in the form of an electrically erasable programmable read-only memory (EEPROM) and may store programs for signal processing and control in the controller 360 or processed video, audio and data signals. The memory 340 may perform a function of temporarily storing a video, audio or data signal input from the external device interface 330 or the network interface 320. Furthermore, the memory 340 may store an application or an application list, input from the external device interface 330, the network interface 320, or another appropriate type of data interface.

In addition, the memory 340 may store the upgrade data received by the external device interface 330 and the version information of the upgrade device 200. If the display device 300 is released without the upgrade device 200, the memory 340 may set an upgrade device version as a default value such that the version information of the upgrade device 200 can be compared with the default value when the upgrade device 200 is connected to the display device 300.

The user interface 350 may transmit a signal input by the user to the controller 350 or deliver a signal from the controller 360 to the user. For example, the user interface 350 can receive input signals such as a power on/off signal, a channel selection signal, a screen setting signal, etc. from a remote controller 500 according to various communication schemes, such as an RF communication scheme or an IR communication scheme, and process the received input signals, or transmit a control signal from the controller 360 to the remote controller 500.

The controller 360 may be configured to automatically recognize whether the upgrade device 200 is connected to the display device according to plug & play or receives a signal representing connection of the upgrade device 200 from the external device interface 330. Upon recognition of connection of the upgrade device 200 to the display device 300, the controller 360 may verify the version of the upgrade device 200, determine that the display device 300 needs to be upgraded if the upgrade device 200 has an updated version, and upgrade the display device 300. Here, the controller 360 can upgrade at least one of firmware, hardware or software of the display device 300 using the upgrade data received from the upgrade device 200.

As to upgrade of the display device 300, the upgrade device 200 can be provided with control authority such that it can upgrade the display device 300. Alternatively, the controller 360 can upgrade the display device 300 by receiving the upgrade data from the upgrade device 200 as necessary.

The scheduler 365 may perform scheduling such that the upgrade device 200 and the controller 360 can complement each other to perform a function of the display device 300 based on the type of function. Specifically, the scheduler 365 may assign at least one of control authority, time or common resources between the controller 360 and the upgrade device 200 based on the type of the function to be performed by the display device 300. The common resources may correspond to all hardware configurations included in the display device.

For example, the scheduler 365 can assign authority to control the display device 300 for a smart function to the upgrade device 200. In this case, the upgrade device 200 may be set as a master and the controller 360 may be set as a slave, and thus the upgrade device 200 controls the common resources such that the controller 360 can support the operation of the upgrade device 200 under the control of the upgrade device 200.

However, when a function other than the smart function is performed, the scheduler 365 may switch the authority to control the display device 300 between the upgrade device 200 and the controller 360. That is, it may be possible to efficiently control the display device by assigning the control authority through the scheduler 365 to a component more suitable to execute a function on the basis of the type of the function.

While switching of the control authority on the basis of the type of a function through the scheduler 365 has been described as an embodiment, items scheduled by the scheduler 365 are not limited to the control authority. The scheduler 365 can schedule any item that can be assigned or performed in a distributed manner under the control of the upgrade device 200 and the controller 360 in addition to time and common resources.

The memory 340 may store scheduling data for assignment of the control authority or common resources between the upgrade device 200 and the controller 365 on the basis of type of a function executed in the display device 300. Accordingly, the upgrade device 200 and the controller 360 can complementarily operate after the upgrade device 200 is connected to the display device.

The scheduling data may correspond to data necessary for the controller 360 and the upgrade device 200 to operate together, such as control authority corresponding to the type of a function, time when the control authority is assigned, time when the function is performed, a common resource assignment basis, or a common resource utilization rate. The memory 340 can classify functions controlled by the controller 360 and functions controlled by the upgrade device 200 and store the classified functions, as described in further detail with reference to FIGS. 5 and 6.

The scheduler 365 can determine whether a function is controlled by the controller 360 or the upgrade device 200 with reference to the functions classified and stored by the memory 340, and switch the control authority corresponding to the function between the controller 360 and the upgrade device 200, thereby achieving efficient control.

For example, if the smart function performed by the display device 300 is classified as a function controlled by the upgrade device 200, the scheduler 365 sets the upgrade device to be the master and sets the controller 360 to be the slave and assigns the control authority to the upgrade device 200 upon reception of a smart function execution request signal. If the smart function is classified as a function controlled by the controller 360, the controller 360 can be configured to be the master and the upgrade device 200 can be the slave.

To achieve this, the scheduler 365 can set a master-slave protocol between the upgrade device 200 and the controller 360. The master-slave protocol defines in advance the particulars necessary to drive the display device, such as a method of transmitting data between the upgrade device 200 and the controller 360, functions performed in each device, etc. The master-slave protocol may define a communication method and transmission/reception data definitions. Accordingly, the scheduler 365 can control the controller 360 and the upgrade device 200 to share necessary information using the master-slave protocol. Moreover, while the scheduler 365 is illustrated as a separate element, the scheduler 365 may be incorporated in the controller 360 or the upgrade device 200

The display unit 370 may convert a video signal, a data signal or an OSD signal processed by the controller 360, or a video signal or a data signal received from the external device interface 330 into an RGB signal to generate a driving signal. The display unit 370 may be a PDP, an LCD, an OLED, a flexible display, a 3D display or another appropriate type of display. The display unit 370 can directly receive upgraded content or graphic data from the upgrade device 200 and may display the received content or data.

The audio output unit 380 may receive an audio signal processed by the controller 360, for example, a stereo signal, a 3.1-channel signal, a 5.1-channel signal, or the like, and may output the received signal as sound. The audio output unit 380 can be implemented as one of a variety of speakers.

The power supply unit 390 supplies power to the display device 300. For example, the power supply unit 390 can provide power to the controller 360 that can be configured in the form of an SoC, the display unit 370 for displaying images, and the audio output unit 380 for outputting audio.

The remote controller 500 may transmit user input to the user interface 350. To achieve this, the remote controller 500 can use Bluetooth, RF communication, IR communication, Ultra Wideband (UWB), ZigBee, etc. The remote controller 500 will be described in more detail with reference to FIGS. 11 and 12.

The upgrade device 200 may include hardware or software capable of upgrading the hardware or software of the display device 300. The upgrade device 200 may be removably connected to the display device 300. The upgrade device 200 may be implemented in the form of a card or a dongle to be detachably set in the display device 300. The upgrade device 200 can include at least one of content for improving the smart function in the display device 300, control data for controlling the smart function or graphic data.

Figure 4:
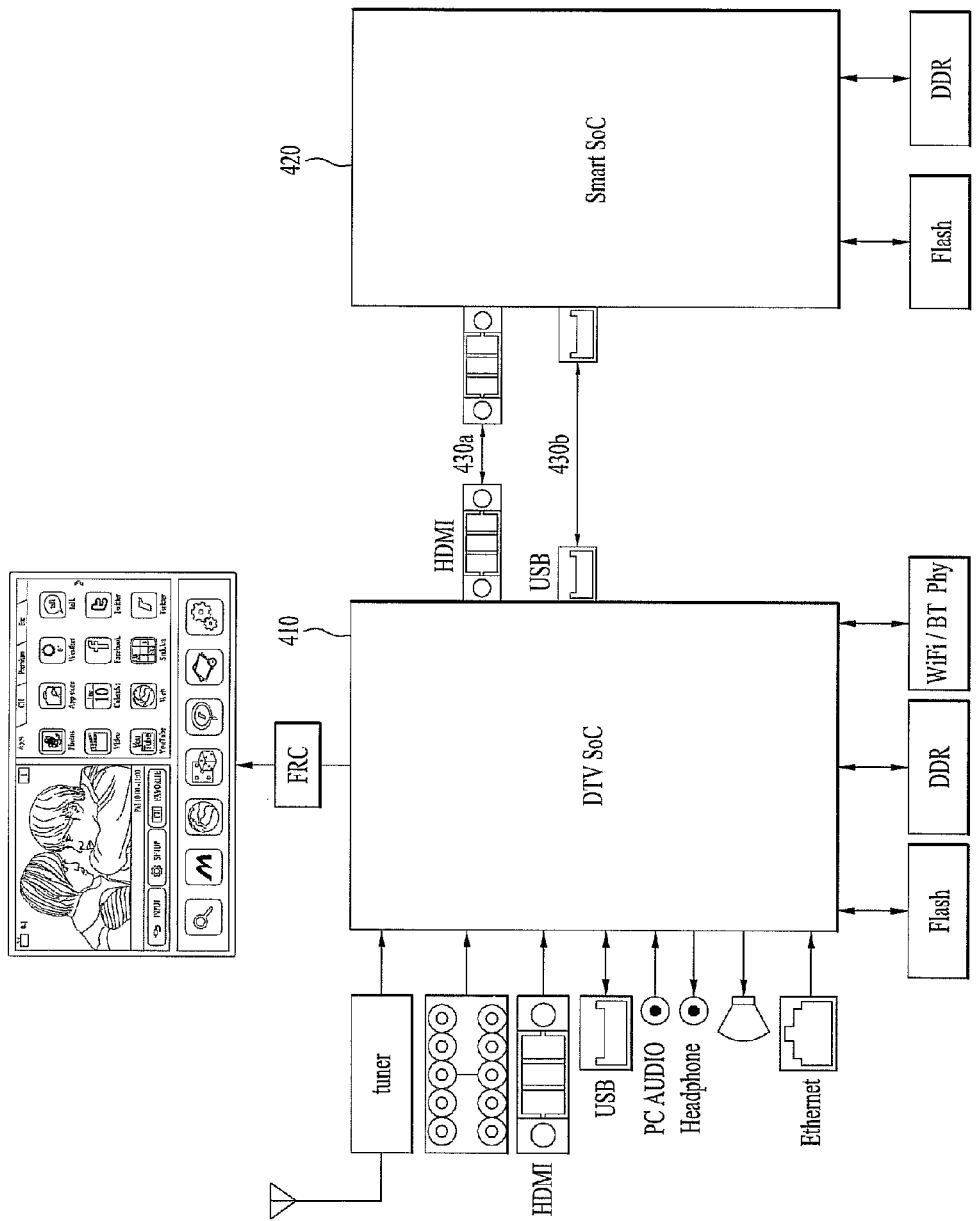
FIG. 4 is a block diagram of a display device equipped with an upgrade device according to one embodiment of the present disclosure.

FIG. 4 is a block diagram of a display device 400 equipped with an upgrade device according to one embodiment of the present disclosure. The display device 400 may include a controller 410 that is connected to an upgrade device 420. The controller 410 and upgrade device 420 may be an SoC.

The controller 410 may be configured in the form of an SoC and may include a central processing unit (CPU), a digital signal processor (DSP), and a micro control unit (MCU). The upgrade device 420 may also be configured in the form of an SoC. The upgrade device 420 can easily cope with upgrade functions or new standards since it is configured in the form of an SoC. Furthermore, it is possible to easily support a modified user experience (UX) and user interface (UI) of the display device through extended memory capacity.

Upon connection of the upgrade device 420 to the display device, the controller 410 and the upgrade device 420 may operate according to the master-slave protocol and designated as a master or slave by the scheduler 365. Accordingly, the upgrade device 410 may be set as the master and the controller 410 may be set as the slave, or vice versa.

For example, the upgrade device 420 can be the master and the controller 410 can be the slave to upgrade the display device to have smart function capabilities. In this case, the controller 410 may only perform a function of supporting the upgrade device 420 while the upgrade device has authority to control the display device. Conversely, the controller 410 may be set as the master and the upgrade device 420 can be set as the slave for other functions, such as, the broadcast reception function, display function, or another appropriate type of function suitable for processing on the controller 410 of the display device.

Upon operation of the master-slave protocol, the upgrade device 420 and the controller 410 may share SoC information thereof. The upgrade device 420 and the controller 410 can also share device mapper information and virtual device driver information. To transmit commands and large-capacity data between the two SoCs corresponding to the upgrade device 420 and the controller 410, a peripheral component interconnect (PCI) module may be connected between the upgrade device 420 and the controller 410. By using PCI, it may be possible to support not only PCI cards but also an ISA extension card which is currently the most widely used extension card. More efficient transmission can be achieved, for example, by using PCIe2.08-lane or PCIe33.04-lane.

When the master-slave protocol operates such that the upgrade device 420 is set as the master, the external device interface 330 can receive upgrade data through a universal serial bus (USB) or a high definition multimedia interface (HDMI). For example, when a function that is not supported by the controller 410 needs to be upgraded, necessary data can be transmitted to the upgrade device 420 through a USB interface 430*b*, and upgraded content can be delivered to the controller 410 through an HDMI interface 430*a* and displayed.

When the master-slave protocol operates such that the upgrade device 420 is set as the master, the display unit 370 can directly receive graphic data from the upgrade device 420 and display the graphic data. Here, a low voltage differential signaling (LVDS) cable can be used. In this case, a cable configuration may be simplified since a set-top terminal is directly connected to input/output terminals (composite, component, DVI, etc.), and a USB, Ethernet LAN, HDMI, or the like, can be supported as interfaces for communication with external devices.

As described above, the master-slave protocol may be operated by the scheduler 365 with reference to the memory 340, which is described with reference to FIGS. 5 and 6.

Figure 5:
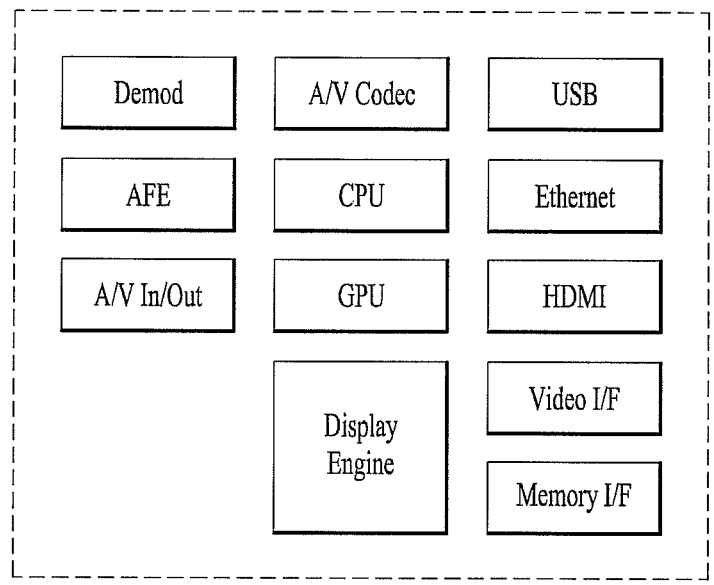
FIG. 5 is a block diagram of an SoC (System on Chip) of a display device according to one embodiment of the present disclosure.

FIG. 5 is a block diagram of an SoC of a display device. The display device may be embedded with modules for executing the broadcast reception function and the smart function. These modules and corresponding functions are not shared with an upgrade device, e.g., an upgrade device is not connected to the display device. These modules are designed and developed along with the display device and controlled by the controller of the display device as necessary. Accordingly, it may be difficult to upgrade and update the display device having functions that are not separated.

Figure 6:
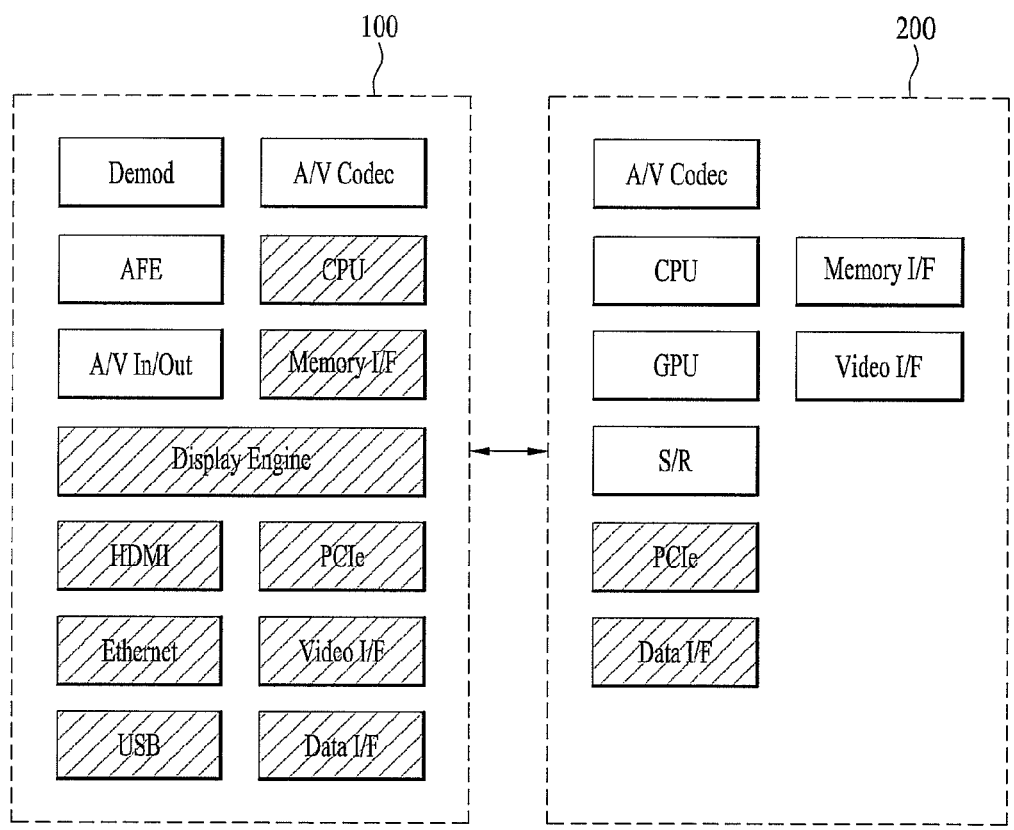
FIG. 6 is a block diagram of an SoC of a display device and an upgrade device having distributed functions according to one embodiment of the present disclosure.

FIG. 6 is a block diagram of an SoC of a display device and an upgrade device having distributed and modularized functions according to one embodiment of the present disclosure. The upgrade device 200 may include modules that are necessary to perform the smart function. Accordingly, the smart function of the display device 100 can be executed and controlled using the modules of the upgrade device 200. In addition, modules of the display device 100 can be used along with the modules of the upgrade device 200 such that the modules of the display device 100 and the modules of the upgrade device 200 can complement each other. Otherwise, the modules of the display device 100 can be used for basic functions such as a broadcast reception function.

Since the smart function is separated from the display device, a PCI module for communication between the display device 100 and the upgrade device 200 can be used to connect the display device 100 and the upgrade device 200. When the PCI module is used, an ISA extension card, one of the most widely used extension cards, can be supported along with new PCI cards. It should be appreciated that the functional modules as illustrated in FIG. 6 are exemplary and the present disclosure is not limited thereto. The configuration of the functional modules may be modified based on need and classification of the functions.

An upgrade device can include an analog signal processor and a digital signal processor. The digital signal processor can be replaced by an upgraded digital signal processor, which will now be described in detail with reference to FIGS. 7, 8 and 9.

Figure 7:
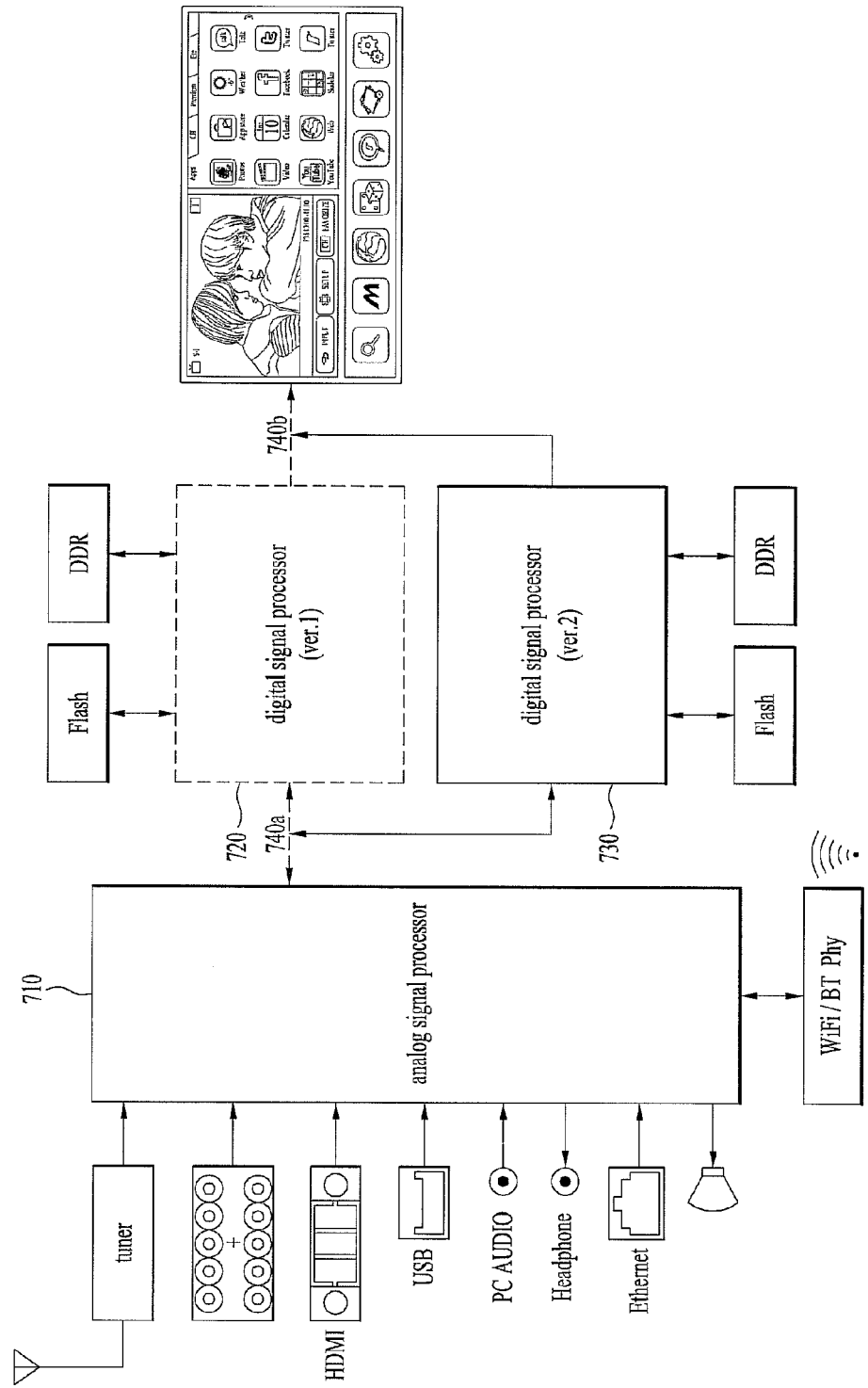
FIG. 7 is a block diagram of an upgrade device according to one embodiment of the present disclosure.

FIG. 7 is a block diagram of an upgrade device according to one embodiment of the present disclosure. The upgrade device may include an analog signal processor 710 and a digital signal processor 720. The analog signal processor 710 may include an input/output (I/O) jack. Accordingly, an interface can be simplified while maintaining the existing jack layout and change of SoC line-up can be minimized. The digital signal processor 720 can be replaced by an updated digital signal processor 730. The digital signal processors 720 and 730 may include a video demodulator, a transcoder, a CPU, a GPU, a DVR engine, an audio DSP, etc., and may further include a memory.

The memory may store firmware necessary to control and manage hardware of the display device or the upgrade device and can be implemented as a storage medium such as a flash ROM, DDR, or the like. Firmware adapted to the display device is stored in the memory and shipped when the upgrade device is shipped, and the digital signal processor 730 having an updated version may be released with updated firmware.

In this case, it is possible to enable modular SoC design by standardizing an interface 740*a* between the analog signal processor 710 and the digital signal processors 720 and 730 and an interface 740*b* between the digital signal processors 720 and 730 and a display panel and embedding the standardized interfaces 740*a* and 740*b* in an SoC.

When the updated digital signal processor 730 is released, the obsolete digital signal processor 720 may be replaced by the updated digital signal processor 730 and discarded. The embodiments described with reference to FIGS. 8 and 9 describe utilization of a dated digital signal processor.

Figure 8:
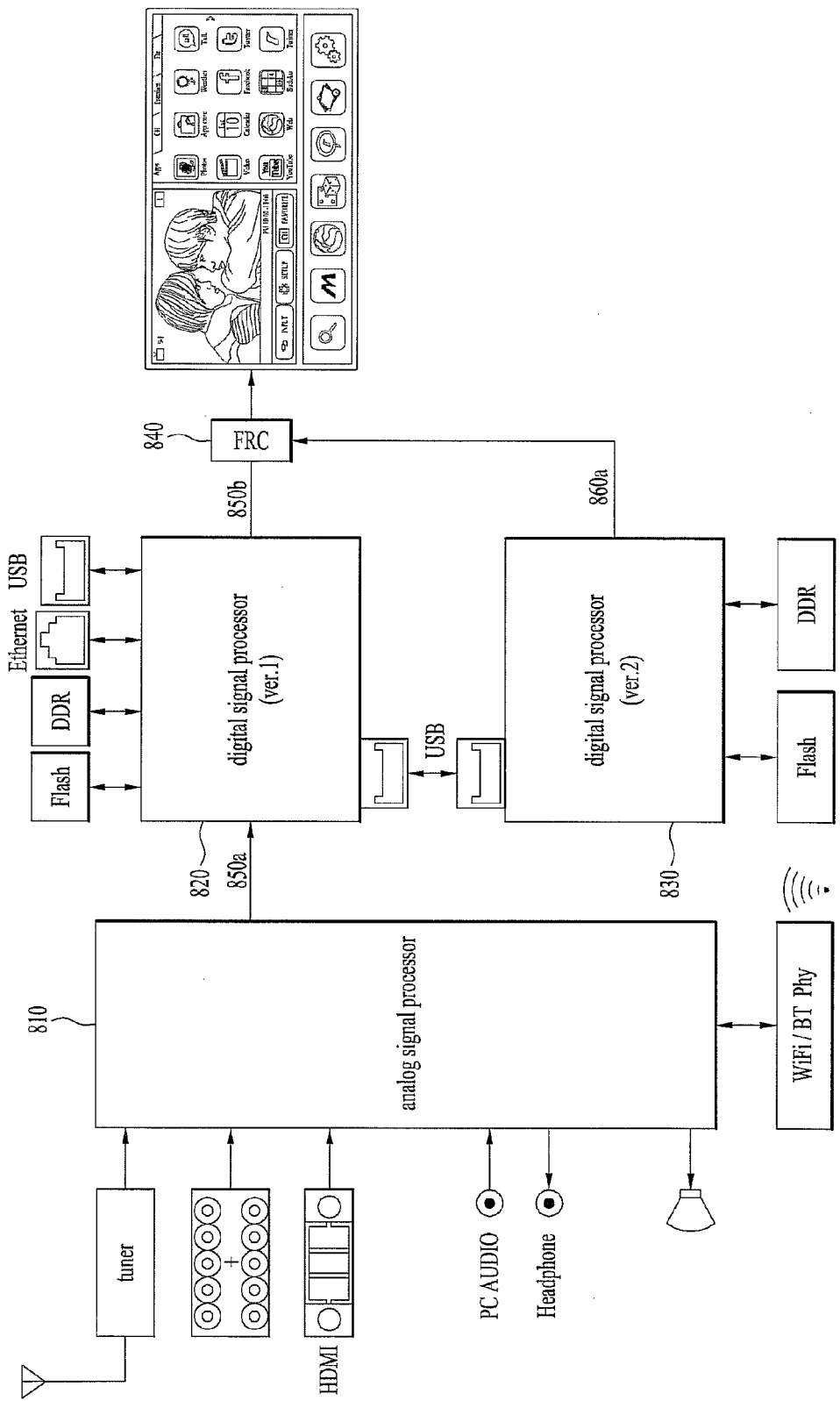
FIG. 8 is a block diagram of an upgrade device according to one embodiment of the present disclosure.

FIG. 8 is a block diagram of an upgrade device according to one embodiment of the present disclosure that includes an analog signal processor 810 and a digital signal processor 820. The analog signal processor 810 may include an input/output (I/O) jack. Accordingly, an interface can be simplified while maintaining the existing jack layout and change of SoC line-up can be minimized.

The digital signal processors 820 may include a video demodulator, a transcoder, a CPU, a GPU, a DVR engine, an audio DSP, etc., and may further include a separate memory, an Ethernet terminal, a USB terminal or the like. The digital signal processor 820 can be replaced by an updated digital signal processor 830. Distinguished from the embodiment of FIG. 7, the digital signal processor 820 may be used to supplement the updated digital signal processor 830, for example, to optimize traffic to the updated digital signal processor 830 while being replaced by the updated digital signal processor 830.

Accordingly, an interface 850*a* between the analog signal processor 810 and the digital signal processor 820 and an interface 850*b* between the digital signal processor 820 and a display panel can be maintained. The obsolete digital signal processor 820 and the updated digital signal processor 830 may transmit/receive upgrade data through a USB port. The upgrade data can be directly transmitted to the display panel through a path 860*a* to be displayed as necessary.

In this case, it is possible to enable modular SoC design by standardizing the interface 850*a* between the analog signal processor 810 and the digital signal processors 820 and 830 and the interface 850*b* between the digital signal processors 820 and 830 and the display panel and embedding the standardized interfaces 850*a* and 850*b* in an SoC.

Figure 9:
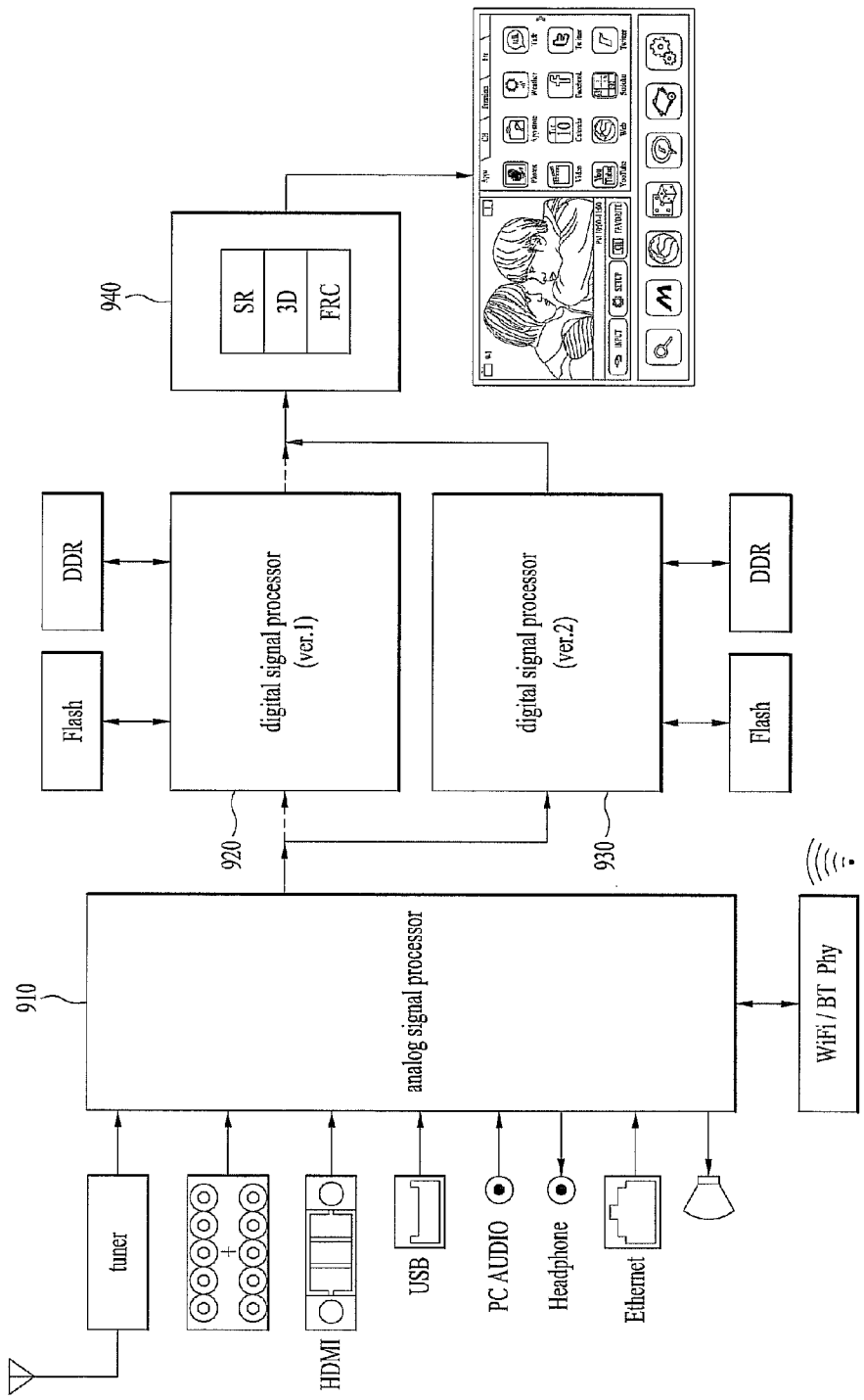
FIG. 9 is a block diagram of an upgrade device according to one embodiment of the present disclosure.

FIG. 9 is a block diagram of an upgrade device according to one embodiment of the present disclosure that includes an analog signal processor 910 and a digital signal processor 920. The analog signal processor 910 may include an input/output (I/O) jack. Accordingly, an interface can be simplified while maintaining the existing jack layout and change of SoC line-up can be minimized.

The digital signal processors 920 may include a video demodulator, a transcoder, a CPU, a GPU, a DVR engine, an audio DSP, etc., and may be replaced by an updated digital signal processor 930, distinguished from the embodiment of FIG. 8. The upgrade device of this embodiment can include a video processor 940 configured in the form of a chip, which processes graphics data prior to being displayed on a display panel, distinguished from the embodiments of FIGS. 7 and 8. Accordingly, upgraded content can be displayed through the separate chip.

The video processor 940 can convert an output video signal such that the output video signal is adapted to a vertical frequency, resolution, aspect ratio or the like, corresponding to the output standard of the display panel. That is, it is possible to adjust a frame rate or process data to be displayed, such as processing for 3D images, through the video processor 940. Accordingly, functions performed by the digital signal processors 920 and 930 can be reduced so as to achieve a more efficient configuration through the upgrade.

Figure 10:
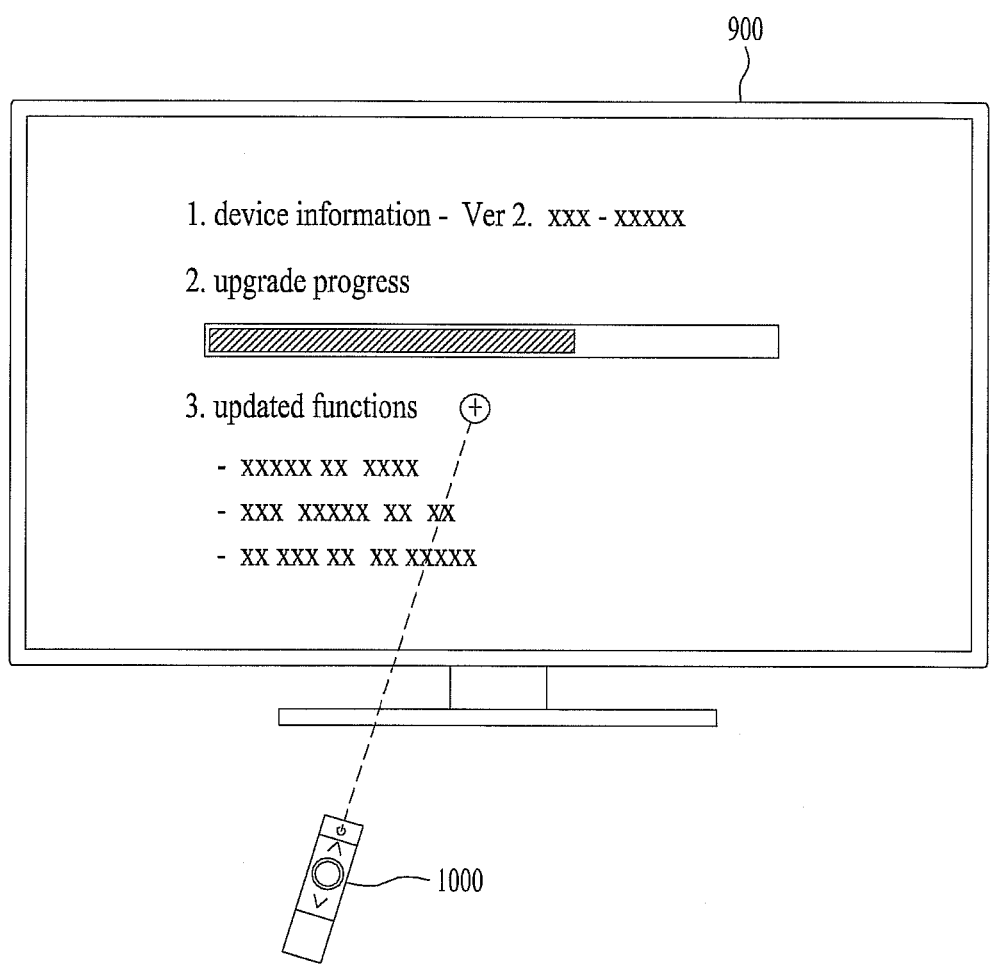
FIG. 10 is a diagram that illustrates a display of upgrade related information on a display device according to an embodiment of the present disclosure.

FIG. 10 is a diagram that illustrates a display of information regarding upgrade through a display device according to an embodiment of the present disclosure. A display panel of a display unit 1000 can display at least one of upgrade device information, progress of an upgrade process, details of upgrade of the display device, upgradeable function information, upgraded function information, or another appropriate type of information. When this information regarding upgrade is provided to the user and upgraded functions are informed, the user can use the display device more efficiently.

Furthermore, when an item using a remote controller 1000 from items displayed on the display panel is selected, as illustrated in FIG. 10, the details regarding the selected item may be displayed. The remote controller 1000 can use Bluetooth, RF communication, IR communication, UWB, ZigBee, etc., which will now be described with reference to FIGS. 11 and 12.

Figure 11C:
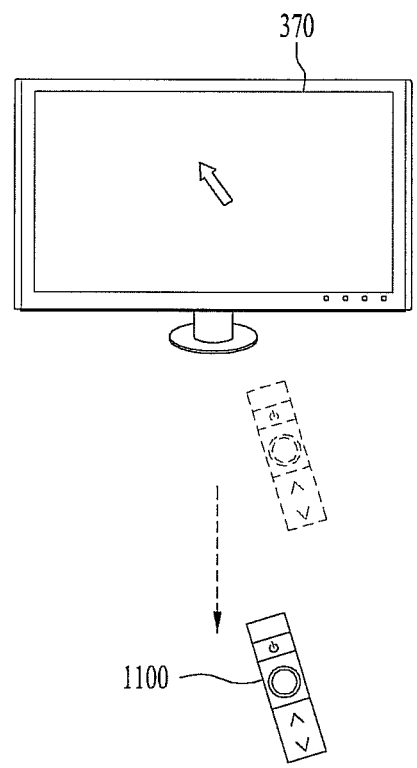
FIG. 11 is a diagram that illustrates an operation of a remote controller for controlling a display device according to an embodiment of the present disclosure.

FIGS. 11A to 11C are diagrams that illustrate an operation of a remote controller for controlling a display device according to an embodiment of the present disclosure. As illustrated in FIG. 11A, a pointer 1101 corresponding to the remote controller 1100 may be displayed on the display 370 of the display device. The display 370 shown in FIG. 11 may correspond to the display of the display device shown in FIG. 3.

The remote controller 1100 may be moved up and down and to the left and right (FIG. 11B), the remote controller 1100 may be moved back and forth (FIG. 11C), or the remote controller 1100 may be rotated. The pointer 1101 displayed on the display unit 370 may indicate motion of the remote controller 1100. The remote controller 1100 can be referred to as a spatial remote controller since the pointer 1101 is moved along with motion of the remote controller 1100 in a 3D space.

FIG. 11B illustrates that the pointer 1101 displayed on the display 370 may move to the left when the user moves the remote controller 1100 to the left. Information about a motion of the remote controller 1100, sensed by a sensor of the remote controller 1100, may be transmitted to the display device 300. The display device 300 can compute coordinates of the pointer 1101 from the information about the motion of the remote controller 1100. The display device 300 can display the pointer 1101 at the computed coordinates.

FIG. 11C illustrates a case in which the remote controller 1100 is moved away from the display 370 while pressing a specific button of the remote controller 1100. In this case, a selected region on the display 370, which corresponds to the pointer 1101, may be zoomed in and magnified. Conversely, when the remote controller 1100 is moved closer to the display 370, the selected region on the display 370, which corresponds to the pointer 1101, may be zoomed out and reduced.

Therefore, the smart function performed by the display device can be selected rapidly and conveniently by using the remote controller 1100, as illustrated in FIG. 11.

FIG. 12 is a block diagram of the remote controller 1100 of FIG. 11. The remote controller 1100 may include an RF communication unit 1110, a user input unit 1120, a sensor unit 1130, an output unit 1140, a storage unit 1150, a power supply unit 1160, and a controller 1170. The RF communication unit 1110 may transmit/receive signals to/from the above-mentioned display device.

The remote controller 1100 may include an RF module 1111 capable of transmitting/receiving signals to/from a display device 1200 according to an RF communication protocol. In addition, the remote controller 1100 may include an IR module 1113 capable of transmitting/receiving signals to/from the display device 1200 according to an IR communication protocol.

The remote controller 1100 may transmit a signal including information regarding motion of the remote controller 1100 to the display device 1200 through the RF module 1111. The remote controller 1100 can receive a signal transmitted from the display device 1200 through the RF module 1111. The remote controller 1100 can transmit a power on/off command, a channel change command, a volume change command, etc., to the display device 1200 through the IR module 1113 as necessary.

The user input unit 1120 can be configured as a keypad, buttons, a touch pad, a touchscreen or another appropriate type of input interface. The user can input a command relating to the display device 1200 to the remote controller 1100 by operating the user input unit 1120. The sensor unit 1130 may include a gyro sensor 1131 or an acceleration sensor 1133.

For example, the gyro sensor 1131 can sense information about operation of the remote controller 1100 on the basis of x, y and z axes. The acceleration sensor 1133 can sense information about a moving speed of the remote controller 1100. The sensor unit 1130 may further include a distance measurement sensor to sense a distance between the remote controller 1100 and the display device 1200.

The output unit 1140 can output a video signal or an audio signal corresponding to an operation of the user input unit 1120 or a signal transmitted from the display device 1200. The user can recognize whether the user input unit 1120 is operated or whether the display device 1200 is controlled through the output unit 1140.

For example, the output unit 1140 can include an LED module 1141 which is turned on, a vibration module 1143 generating vibration, a sound output module 1145 outputting sound, or a display module 1147 displaying an image, when the user input unit 1120 is operated or a signal is transmitted/received between the output unit 1140 and the display device 1200.

The storage unit 1150 can store various programs necessary for control or operation of the remote controller 1100, application data, etc. If the remote controller 1100 transmits/receives an RF signal to/from the display device 1200 through the RF module 1111, the remote controller 1100 and the display device 1200 may transmit/receive the RF signal through a predetermined frequency band.

The power supply unit 1160 provides power to the remote controller 1100. The power supply unit 1160 can interrupt power supply when the remote controller 1100 is not moved for a predetermined time to reduce power waste. The power supply unit 1160 can resume power supply when a predetermined key of the remote controller 1100 is operated.

The controller 1170 may control the overall operation of the remote controller 1100. The controller 1170 can transmit a signal corresponding to a predetermined key operation of the user input unit 1120 or a signal corresponding to motion of the remote controller 1100, which is sensed by the sensor unit 1130, to the display device 1200 through the RF communication unit 1110.

Figure 13:
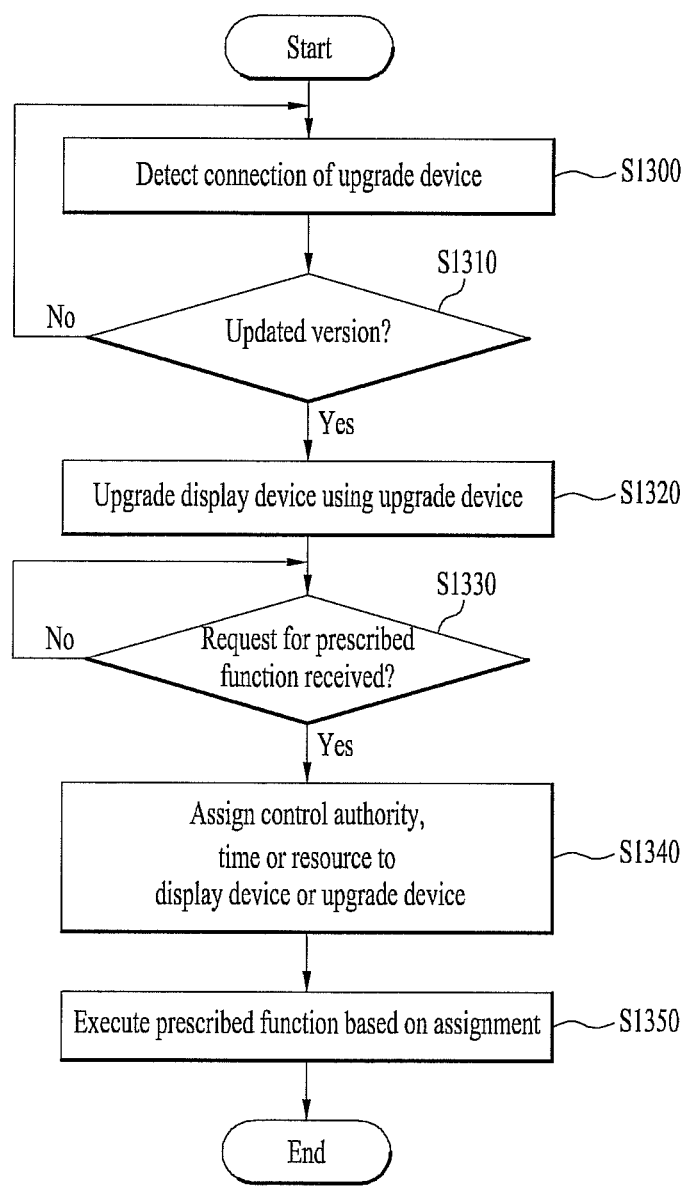
FIG. 13 is a flowchart of a method for controlling the upgradeable display device according to one embodiment of the present disclosure.

FIG. 13 is a flowchart of a method for controlling an upgradeable display device according to the one embodiment of the present disclosure. A connection of an upgrade device may be detected, in step S1300. A signal representing a connection of the upgrade device to the display device may be received. This signal may be recognized by the external device interface when the upgrade device is connected to the display device and the signal transmitted to the controller. Otherwise, the connection of the upgrade device can be automatically recognized by the controller according to plug & play.

Upon reception of the signal, it is determined whether the connected upgrade device is an updated upgrade device, in step S1310. If there is a previously connected upgrade device, it is possible to determine whether the newly connected upgrade device has an updated version by comparing the version information for the newly connected upgrade device with version information of the previously connected upgrade device. The version information of the previously connected upgraded device may be stored in the memory. Even when there is no previously connected upgrade device, it may be possible to recognize whether the newly connected upgrade device has an updated version since a default version information may be stored in the memory.

When it is determined that the newly connected upgrade device has an update, the display device is upgraded using the upgrade device, in step S1320. At least one of firmware, hardware or software of the display device may be upgraded using upgrade data received from the upgrade device. Specifically, the at least one of firmware, hardware or software of the display device can be upgraded using the upgrade data received from the upgrade device through at least one of a PCI module, USB, HDMI or another appropriate type of connection. The display device may be upgraded to update or install rapidly changing smart functions for the display device.

The upgrade device may include hardware or software capable of upgrading the display device in a hardware or software manner and may be separately connected to the display device. Accordingly, the upgrade device can include content for implementing the smart function in the display device, control data for controlling the display device and graphic data. In this case, the upgrade device can be implemented in the form of an SoC or a dongle.

To use existing hardware configurations of both the upgrade device and the display device after the upgrade, scheduling data, which is used for the controller of the display device and the upgrade device to complement each other in executing a function of the display device on the basis of the type of the function, can be stored in the memory when the display device is upgraded.

The scheduling data may be necessary for the controller and other existing hardware of the display device and the upgrade device to control the display device complementarily and may include an assignment basis for at least one of control authority, time or common resources. The scheduling data may correspond to data necessary for the display device and the upgrade device to operate together, such as control authority corresponding to the type of a function, time when the control authority is assigned, time when the function is performed, a common resource assignment basis, or a common resource utilization rate. The scheduling data may be set when the upgrade device is developed and stored in the memory of the upgrade device, and transmitted to the memory of the display device after the display device has been upgraded. Otherwise, the display device may retrieve the scheduling data from an external device (e.g., upgrade device, remote server) having the scheduling data stored therein.

It is determined whether a signal for requesting a prescribed function of the display device is received, in step S1330. For example, a request for a particular function may be received through the remote controller 1000. When the request signal is received, at least one of the control authority, time or common resources may be assigned between the controller of the display device and the upgrade device with reference to the memory to schedule the specific function, in step S1340. For example, various tasks may be assigned to the controller of the display device and/or upgrade device to execute the requested function. The controller and the upgrade device may complement each other to perform the specific function according to the scheduling result, in step S1350. Since the controller and the upgrade device complementarily perform a function of the display device, the system can be efficiently operated without relying entirely on either the display device or the upgrade device.

Figure 14:
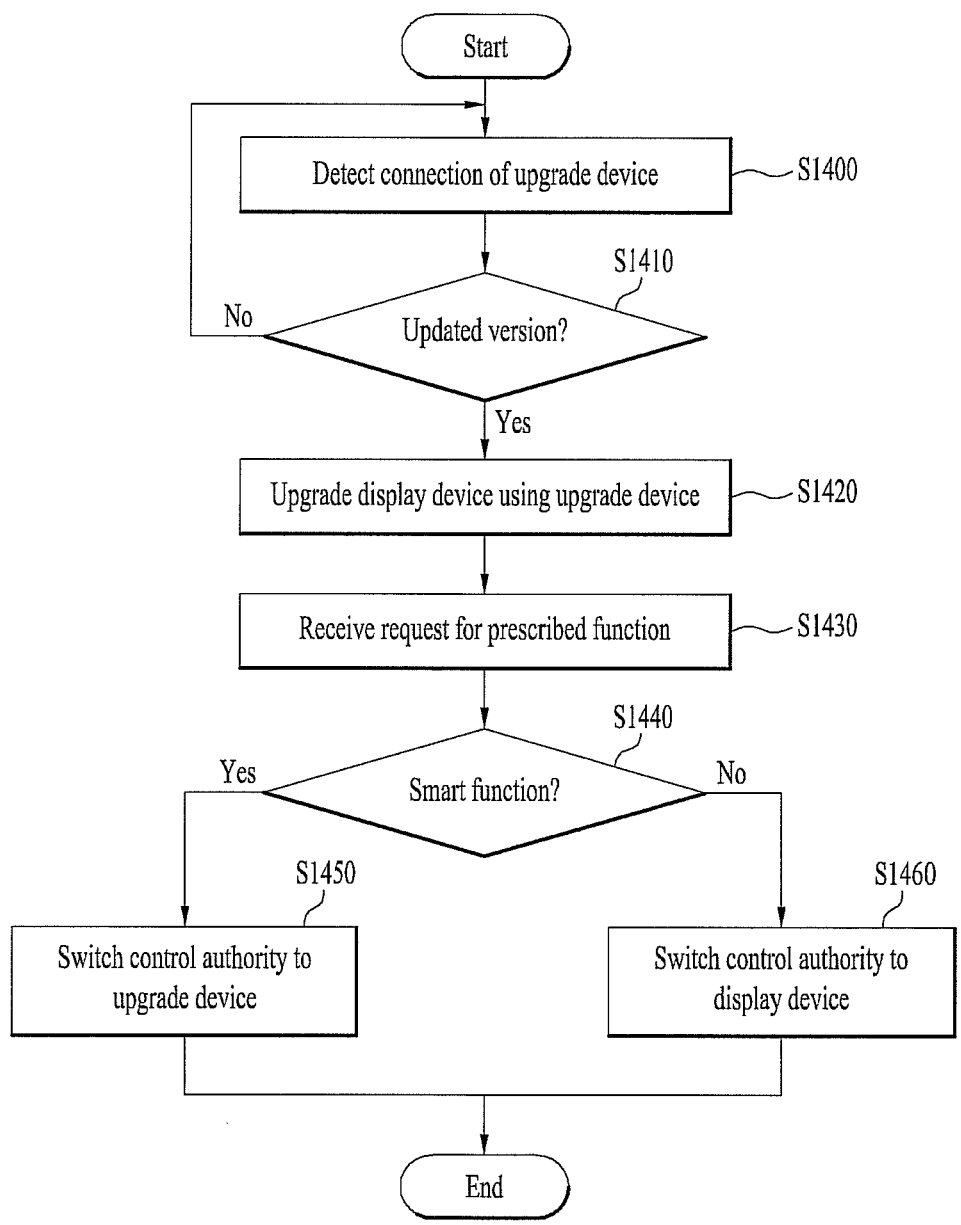
FIG. 14 is a flowchart of a method for controlling the upgradeable display device according to one embodiment of the present disclosure.

FIG. 14 is a flowchart of a method for controlling the upgradeable display device according to one embodiment of the present disclosure. In this embodiment, the controller of the display device and the upgrade device complementarily operate according to scheduling of control authority.

A signal representing connection of the upgrade device to the display device is received, in step S1400. This signal may be recognized by the external device interface when the upgrade device is connected to the display device and transmitted to the controller. Otherwise, the connection of the upgrade device can be automatically recognized by the controller according to plug & play.

Upon reception of the signal, it is determined whether the connected upgrade device is an updated upgrade device, in step S1410. If there is a previously connected upgrade device, it is possible to determine whether the newly connected upgrade device has an updated version by comparing the version information of the newly connected upgrade device with the version information of the previously connected upgrade device, which may be stored in the memory. Even when there is no previously connected upgrade device, it may be possible to recognize whether the newly connected upgrade device has an updated version since an upgrade device version may be set as a default value and stored in the memory.

When it is determined that the newly connected upgrade device has been updated, the display device is upgraded using the upgrade device, in step S1420. At least one of firmware, hardware or software of the display device can be upgraded using upgrade data received from the upgrade device. Specifically, the at least one of firmware, hardware or software of the display device can be upgraded using the upgrade data received from the upgrade device through at least one of a PCI module, a USB, an HDMI or another appropriate type of connection. For example, the display device may be updated to include newly available smart functions using the upgrade device.

The upgrade device may include hardware or software capable of upgrading the display device in a hardware or software manner and separably connected to the display device. Accordingly, the upgrade device can include content for implementing the smart function in the display device, control data for controlling the display device and graphic data. In this case, the upgrade device can be implemented in the form of an SoC or a dongle.

When the display device is upgraded using the upgrade device or when connection of the upgrade device to the display device is recognized, authority to control the display device may be switched between the controller of the display device and the upgrade device such that the control authority is assigned to the controller or the upgrade device according to the type of a function of the display device. Accordingly, functions of the display device can be classified as the smart function and other functions in order to switch the control authority according to function type, and control authority corresponding to function type can be stored in the memory. The basis of function classification may be changed as necessary.

When the functions of the display device are classified as the smart function and other functions, as described above, if a signal for requesting a specific function of the display device is received, in step S1430, it is determined whether the requested function is a smart function, in step S1440. When the specific function corresponds to the smart function, the control authority may be switched to the upgrade device, in step S1450, such that the upgrade device performs the requested smart function. When the specific function is not the smart function, the control authority maybe switched to the controller of the display device, in step S1460, such that the controller performs the function.

In this case, the device having the control authority may control the other devices. For example, when the upgrade device has control authority to perform a function, the controller of the upgrade device may also control the display device. In other words, the device having control authority may operate as the master and the display device without control authority may operate as the slave.

Figure 15:
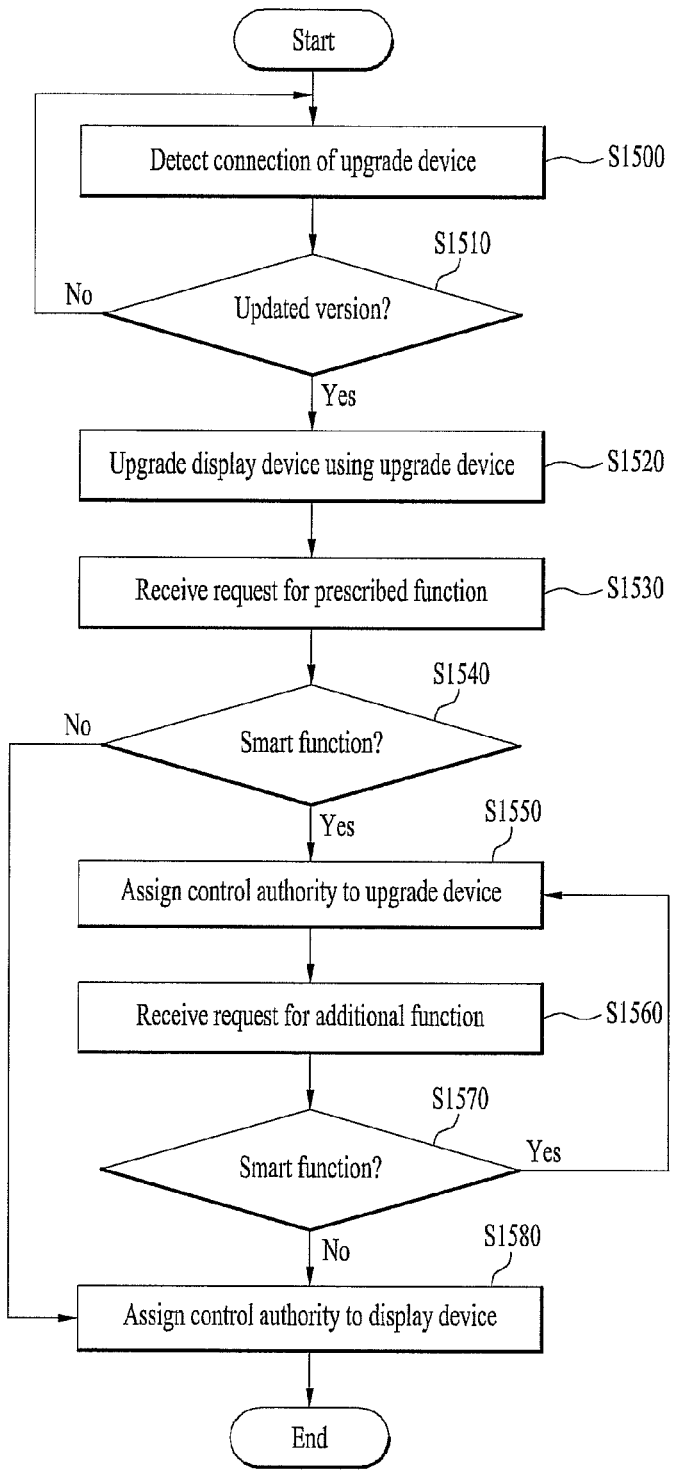
FIG. 15 is a flowchart of a method for controlling the upgradeable display device according to one embodiment of the present disclosure.

FIG. 15 is a flowchart of a method for controlling the upgradeable display device according to one embodiment of the present disclosure. In this embodiment, the control authority is assigned between the controller and the upgrade device such that the controller and the upgrade device complement each other.

Upon reception of a signal that represents connection of the upgrade device to the display device, in step S1500, it is determined whether the connected upgrade device has been updated, in step S1510. If there is a previously connected upgrade device, it is possible to determine whether the newly connected upgrade device has an updated version by comparing the version of the newly connected upgrade device with the version of the previously connected upgrade device, which is stored in the memory. Even when there is no previously connected upgrade device, it is possible to recognize whether the newly connected upgrade device has an updated version since an upgrade device version is set as a default value and stored in the memory.

When it is determined that a new update is available on the upgrade device, the display device is upgraded using the upgrade device, in step S1520. At least one of firmware, hardware or software of the display device can be upgraded using upgrade data received from the upgrade device.

Upon connection of the upgrade device to the display device, the upgrade device or the controller of the display device may be assigned the control authority on the basis of classifications of functions of the display device. Accordingly, when a request for a prescribed function is received, in step S1530, it is determined whether the requested function is a smart function for which the upgrade device has the control authority, in step S1540. When the requested function corresponds to the smart function, the upgrade device is provided with the authority to control the display device so as to perform the prescribed function, in step S1550. When the requested function is not a smart function, the control authority is assigned to the controller of the display device to perform the requested function, in step S1580.

When an additional function request signal is received, in step S1560, it is determined whether the requested function is a smart function for which the upgrade device has the control authority, in step S1570. When the additional function is not a smart function, the authority to control the display device is switched to the controller of the display device such that the controller performs the function, in step S1580. When the requested function corresponds to a smart function, the control authority is assigned to the upgrade device such that the upgrade device executes the requested function.

An additional module (for example, the scheduler shown in FIG. 3) can be provided in order to switch the control authority between the controller of the display device and the upgrade device. Furthermore, the basis of classification of functions of the display device for switching the control authority between the upgrade device and the controller of the display device can be changed. For example, the basis can be set such that a function relating to music is executed by the controller of the display device and a function relating to video playback is performed by the upgrade device. Furthermore, distribution and sharing of other resources such as the CPU, GPU, memory, or the like, can additionally be set and stored.

As broadly described and embodied herein, a Smart TV may include a broadcast receiver for receiving a broadcast signal, a demultiplexer for demultiplexing the received broadcast signal, a decoder for decoding the demultiplexed broadcast signal, a display for displaying the decoded broadcast signal, an external device interface for receiving upgrade data from an upgrade device, a controller configured to process the received broadcast signal for display on the display and to upgrade the Smart TV using the received upgrade data, the upgrade data including at least one function, and a control module configured to assign the at least one function to at least one of the upgrade device or the controller to execute the function on the Smart TV.

The at least one function may replace a function previously stored on the Smart TV. The control module may assign the upgrade device to be a master and assigns the controller to be a slave based on a type of the function. The control module may assign at least one of a control authority, time or resource between the controller and the upgrade device for executing the function. When the control module assigns the control authority between the controller and the upgrade device, the control module may set the upgrade device as a master and set the controller as a slave such that a smart function is executed in the upgrade device.

A memory may be provided for storing scheduling data for assigning the control authority or resources such that the upgrade device and the controller cooperatively execute of the at least one function based on a type of the function. The upgrade data and version information of the upgrade device are stored in the memory. Moreover, the controller and the upgrade device transmit or receive data through a peripheral component interconnect (PCI) interface. The external device interface may receive the upgrade data from the upgrade device through a universal serial bus (USB) or a high definition multimedia interface (HDMI) connection.

The controller may upgrade at least one of a firmware, hardware, or software of the Smart TV using the upgrade data received from the upgrade device. The upgrade device may include at least one of content for implementing a smart function on the Smart TV, control data for controlling the Smart TV, or graphic data. The upgrade device may be configured as a system on chip (SoC) or a dongle.

In one embodiment, a method for controlling a Smart TV may include detecting a connection of an upgrade device to the Smart TV, determining whether a version of the connected upgrade device is an updated version, upgrading the Smart TV using the upgrade device based on the determination, receiving a request for a prescribed function, assigning at least one of a control authority, time or resources to a controller of the Smart TV and the upgrade device in response to the request, and executing the requested function on at least one of the controller or the upgrade device based on the assignment.

The upgrading the Smart TV may include storing information associated with assigning the at least one of the control authority, time or resources in the memory, and wherein the requested function is assigned to the upgrade device or controller based on a type of the function. The storing the information in the memory may include classifying at least one function of the Smart TV as a smart function, and assigning control authority for the smart function to the upgrade device.

The upgrading of the Smart TV using the upgrade device may include upgrading at least one of firmware, hardware or software of the Smart TV using the upgrade information received from the upgrade device. The upgrading of the Smart TV using the upgrade device may include upgrading the Smart TV using upgrade data received from the upgrade device through at least one of a USB, an HDMI or PCI. The upgrade device may include at least one content for implementing the smart function on the Smart TV, control data for controlling the Smart TV, or graphic data. Moreover, the upgrade device may be configured as an SoC or a dongle.

In one embodiment, a method for controlling a Smart TV may include detecting a connection of an upgrade device to the Smart TV, determining whether a version of the connected upgrade device is an updated version, upgrading the Smart TV using the upgrade device based on the determination, the upgrading including installing at least one smart function, receiving a request for a prescribed function, determining whether the prescribed function is a smart function, assigning the upgrade device to process the prescribed function if the prescribed function is a smart function, and assigning the controller of the Smart TV to process the prescribed function if the prescribed function is not a smart function.

In one embodiment, an upgradeable display device may include a broadcast receiver for receiving a broadcast signal; a demultiplexer for demultiplexing the received broadcast signal; a decoder for decoding the demultiplexed broadcast signal; a display unit for displaying the decoded broadcast signal; an external device interface for receiving upgrade data from an upgrade device; a controller for controlling the received broadcast signal to be processed and displayed on the display unit and upgrading the display device using the upgrade data; and a scheduler for scheduling such that the upgrade device and the controller complement each other to execute a function of the display device on the basis of the type of the function of the display device.

In one embodiment, a method for controlling an upgradeable display device may include receiving a signal representing connection of an upgrade device to the upgradeable display device; comparing version information of the connected upgrade device with version information of a previous upgrade device, stored in a memory; upgrading the display device using the upgrade device when the connected upgrade device has been updated; receiving a specific function request signal; scheduling at least one of control authority, time and common resources between a controller of the display device and the upgrade device in response to the specific function request signal; and the controller and the upgrade device complementing each other to execute the specific function in response to a scheduling result.

The method for controlling the upgradeable display device according to the present disclosure can be embodied as computer readable code on a computer readable medium. The computer readable medium is any data storage device that stores data which can be read by a computer system. Examples of the computer readable medium include read-only memory (ROM), random-access memory (RAM), CD-ROM, magnetic tape, floppy disk, optical data storage devices, and so on. The computer readable medium can also be embodied in the form of carrier waves as signals communicated over the Internet. The computer readable medium can also be distributed over a network of coupled computer systems so that the computer readable code is stored and executed in a distributed fashion.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An upgradable multi-functional display device, comprising:
    an upgrade device configured to be removably connected to the upgradable multi-functional display device and comprising upgrade data configured to provide at least one additional function to the upgradable multi-functional display device;
    a broadcast receiver configured for receiving a broadcast signal;
    a demultiplexer configured for demultiplexing the received broadcast signal;
    a decoder configured for decoding the demultiplexed broadcast signal;
    a display configured for displaying the decoded broadcast signal;
    an external device interface configured for receiving the upgrade data from the upgrade device;
    a controller configured to
        process the received broadcast signal for display on the display, and
        upgrade at least one of firmware, hardware, or software of the upgradable multi-functional display device using the upgrade data received from the upgrade device, and
    a control module configured to assign control authority for executing a function so that the upgrade device and the controller cooperatively execute the function, wherein the control module is configured to
        when the function to be executed is the at least, one additional function provided by the upgrade data of the upgrade device, assign control authority to the upgrade device to control the upgradable multi-functional display device and assign the controller to support the upgrade device such that the additional function is executed in the upgrade device, and
        when the function to be executed is a function other than the at least one additional function, assign control authority to the controller to control the upgradable multi-functional display device and assign the upgrade device to operate under the control of the controller.

2. The upgradable multi-functional display device of claim 1, wherein the upgrade device is configured as a system on chip (SoC) or a dongle.

3. A method for controlling an upgradable multi-functional display device, the method comprising:
    connecting an upgrade device configured to be removably connected to the upgradable multi-functional display device via an external device interface, the upgrade device comprising upgrade data configured to provide at least one additional function to the upgradable multi-functional display device;
    detecting a connection of the upgrade device to the upgradable multi-functional display device;
    receiving the upgrade data from the upgrade device;
    upgrading at least one of firmware, hardware, or software of the upgradable multi-functional display device using the upgrade data received from the upgrade device based on the determination;
    receiving a request for executing a prescribed function; and
    assigning control authority for executing the requested function so that the upgrade device and the controller cooperatively execute the requested function, wherein assigning control authority comprises
        when the function to be executed is the at least one additional function provided by the upgrade data of the upgrade device, assign control authority to the upgrade device to control the upgradable multi-functional display device and assign the controller to support the upgrade device such that the additional function is executed in the upgrade device, and
        when the function to be executed is a function other than the at least one additional function, assign control authority to the controller to control the upgradable multi-functional display device and assign the upgrade device to operate under the control of the controller.

4. The method of claim 3, wherein upgrading the upgradable multi-functional display device includes storing scheduling data including assigning the control authority of the upgrade device and the controller for a plurality of functions of the display device in a memory of the upgradable multi-functional display device.

5. The method of claim 3, wherein the upgrading of the upgradable multi-functional display device using the device comprises upgrading the upgradable multi-functional display device using upgrade data received from the device through at least one of a universal serial bus (USB), a high definition multimedia interface (HDMI) and a peripheral component interconnect (PCI).

6. The method of claim 3, wherein the upgrade device is configured as a system-on-chip (SoC) or a dongle.

7. The upgradable multi-functional display device of claim 1, further comprising a memory configured for storing scheduling data including the assignment of control authority of the upgrade device and the controller for a plurality of functions.

8. The upgradable multi-functional display device of claim 1, wherein the upgrading of the upgradable multi-functional display device using the upgrade device comprises upgrading the upgradable multi-functional display device using upgrade data received from the device through at least one of a universal serial bus (USB), a high definition multimedia interface (HDMI) and a peripheral component interconnect (PCI).

9. The upgradable multi-functional display device of claim 1, wherein the upgrade device includes at least one content for implementing functions on the upgradable display device, control data for controlling the upgradable display device, or graphic data.

* * * * *